US012651252B2

(12) United States Patent
Bell et al.

(10) Patent No.:    US 12,651,252 B2
(45) Date of Patent:      Jun. 9, 2026

(54) INFORMATION PROCESSING SYSTEM, METHOD, AND MEDIUM

(71) Applicant: Rakuten Group, Inc., Tokyo (JP)

(72) Inventors: Marty Bell, Tokyo (JP); Sean Casey, Tokyo (JP); Fergal Downey, Tokyo (JP); Hajime Nishinomiya, Tokyo (JP); Masafumi Muta, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 458 days.

(21) Appl. No.: 18/171,882

(22) Filed: Feb. 21, 2023

(65) Prior Publication Data

US 2023/0274270 A1      Aug. 31, 2023

(30) Foreign Application Priority Data

Feb. 24, 2022    (JP) ................................. 2022-026606

(51) Int. Cl.
   *G06Q 20/38*          (2012.01)
   *G06Q 20/02*          (2012.01)
(52) U.S. Cl.
   CPC ......... *G06Q 20/3829* (2013.01); *G06Q 20/02* (2013.01); *G06Q 20/3827* (2013.01)
(58) Field of Classification Search
   CPC ..................... G06Q 20/00–425; H04L 9/00–50
   See application file for complete search history.

(56) References Cited

U.S. PATENT DOCUMENTS

2020/0273048 A1*  8/2020  Andon ................... G06Q 10/02
2022/0345316 A1*  10/2022  Testagrossa .......... H04L 9/3247

OTHER PUBLICATIONS

William Entriken et al., "ERC-721: Non-Fungible Token Standard", Ethereum Improvement Proposals, Jan. 24, 2018, https://eips. ethereum.org/EIPS/eip-721.
Witek Radomski et al., ERC-1155: Multi Token Standard, Ethereum Improvement Proposals, Jun. 17, 2018, https://eips.ethereum.org/ EIPS/eip-1155.

* cited by examiner

*Primary Examiner* — Ari Shahabi
(74) *Attorney, Agent, or Firm* — Sughrue Mion, PLLC

(57)                   ABSTRACT

An information processing system includes a hash value acquisition unit for acquiring a hash value generated based on a key containing content data linked to a non-fungible token; a metadata generation unit for generating metadata for the content, the metadata including an electronic signature generated using the hash value and a predetermined secret key and a resource identifier referenced when acquiring the content data; a metadata identifier acquisition unit for acquiring a metadata identifier uniquely indicating the metadata; and a non-fungible token issuing unit for issuing a non-fungible token linked to the metadata and the content, by recording token data including the metadata identifier in a blockchain.

16 Claims, 11 Drawing Sheets

INFORMATION PROCESSING SYSTEM, METHOD, AND MEDIUM

CROSS-REFERENCE TO RELATED APPLICATION(S)

This application claims priority to and the benefit of Japanese Patent Application No. 2022-026606, filed on Feb. 24, 2022, the disclosure of which is expressly incorporated herein by reference in its entirety for any purpose.

FIELD

This disclosure relates to a distributed ledger such as a blockchain.

BACKGROUND

Conventionally, technologies for generating and trading non-fungible tokens using a blockchain have been proposed (see William Entriken & 3 others, "EIP-721: Non-Fungible Token Standard" https://eips.ethereum.org/EIPS/eip-721, and Witek Radomski & 5 others, "EIP-1155: Multi Token Standard" https://eips.ethereum.org/EIPS/eip-1155).

SUMMARY

Conventionally, in technology for generating and trading NFTs, data indicating the name of content that corresponds to an NFT is managed, and data for referencing the content is also managed. However, with management methods in conventional NFT-related technology, there are limitations on the information that can be referenced in NFT transactions, and there are problems in terms of insufficient convenience and flexibility when making NFT transactions.

In view of the above problems, an object of this disclosure is to improve convenience and flexibility when making an NFT transaction.

An information processing system according to an aspect of this disclosure includes: a hash value acquiring means for acquiring a hash value generated based on a key containing content data linked to a non-fungible token; a metadata generating means for generating metadata for the content, the metadata including an electronic signature generated using the hash value and a predetermined secret key and a resource identifier referenced when acquiring the content data; a metadata identifier acquiring means for acquiring a metadata identifier uniquely indicating the metadata; and a non-fungible token issuing means for issuing a non-fungible token linked to the metadata and the content, by recording token data including the metadata identifier in a blockchain.

This disclosure can be construed as an information processing device, a system, a method executed by a computer, or a program executed by a computer. This disclosure can also be construed as a recording medium that is readable by a computer or another device or machine or the like and has such a program recorded thereon. Here, a computer-readable recording medium is a recording medium that stores information such as data and/or a program in an electrical, magnetic, optical, mechanical, or chemical manner and can be read by a computer or the like.

According to this disclosure, it is possible to improve convenience and flexibility in management of content data corresponding to an NFT.

DESCRIPTION OF EMBODIMENTS

Figure 1:
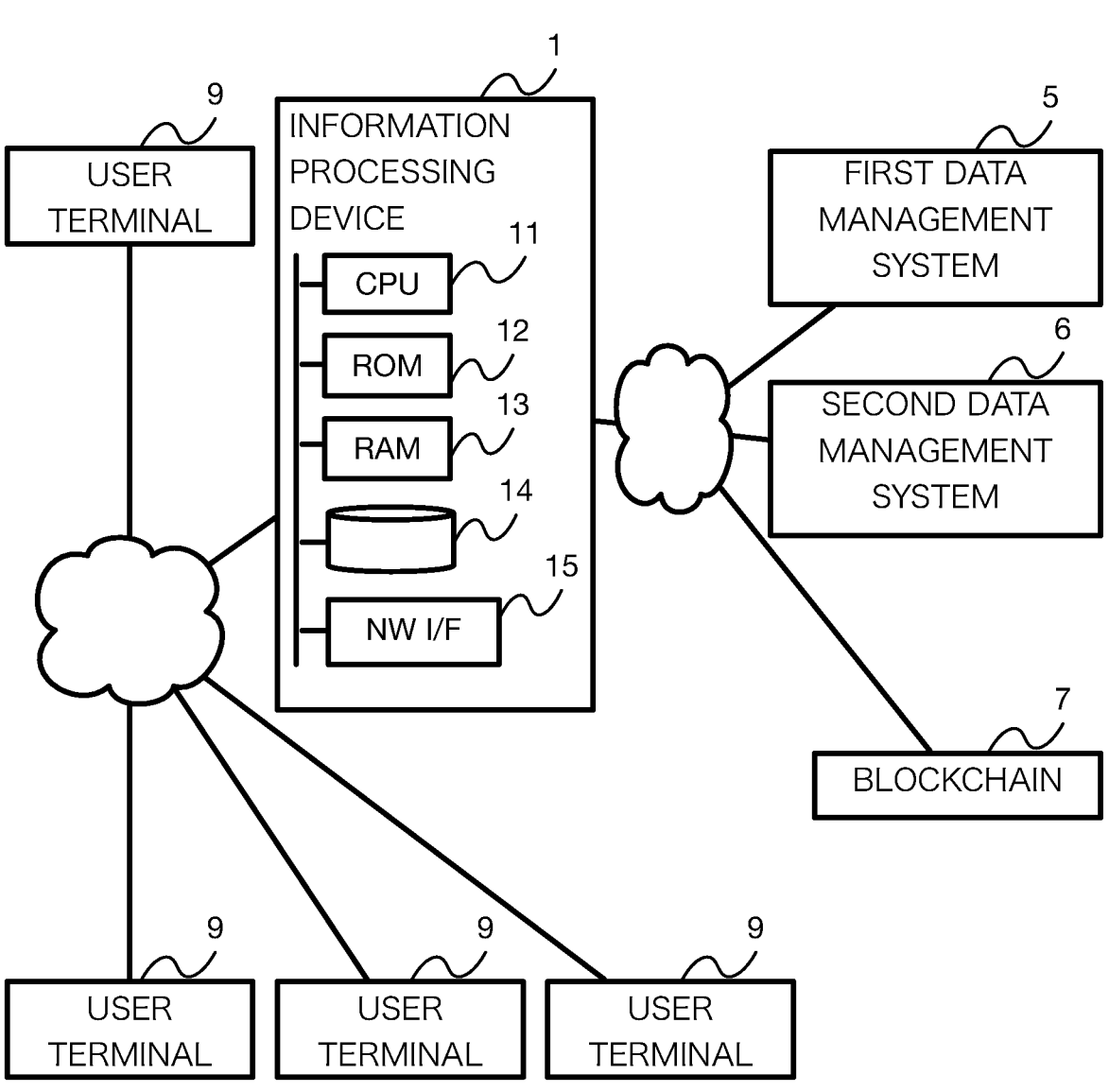
FIG. 1 is a schematic diagram showing a configuration of a system according to an embodiment.

Hereinafter, embodiments of a system, an information processing device, a method, and a program according to this disclosure will be described with reference to the drawings. It should be noted that the embodiments described below are illustrative examples of embodiments, and moreover, the system, the information processing device, the method, and the program according to this disclosure are not intended to be limited to the specific configurations described below. In implementation, specific configurations may be appropriately adopted according to the mode of implementation, and various improvements and modifications may be made.

The present embodiment describes a mode in which the technology according to this disclosure is implemented for a system for generating and trading non-fungible tokens. It should be noted that this disclosure is broadly applicable to technology related to non-fungible tokens, technology related to fungible tokens, and blockchain-related technology, and the application scope of this disclosure is not intended to be limited to the examples shown in the embodiments.

A non-fungible token (hereinafter referred to as an "NFT") is a type of cryptographic token, and, unlike a fungible token (hereinafter referred to as "FT") that can be replaced with another token as long as the amount is the same (e.g., a cryptocurrency), an NFT is a token for indicating the owner of something that cannot be replaced by anything else. The present embodiment describes an example in which NFT issuing and trading is performed by data (e.g., data including a hash value) that can guarantee the correspondence between an NET and an asset being recorded in a so-called blockchain. However, there are no limitations on the technology that can be employed to issue and trade NFTs.

Conventionally, the amount of value to be paid in a transaction of a product, a service, or the like is recorded as data in a ledger file or the like, and the fulfillment of payment can be confirmed. However, such a confirmation method uses a centralized system for data management, and there is a possibility that data may be falsified, and depending on the data management method, some users participating in a transaction may not be able to confirm the data. In view of the above problems, in the system according to the present embodiment, an FT with an amount that is the same as the amount of value to be paid is issued to indicate the amount of value to be paid, and the FT is handled in accordance with the actual value transfer, thereby solving some or all of the above problems.

Also, various techniques for generating and trading NFTs have conventionally been proposed. In such technology, a content-oriented data management system is used to reference content data associated with an NFT, and a resource identifier (e.g., a URI) that includes a hash value of the content data is issued by the content-oriented data management system. However, in this conventional technique, resource identifiers in data management systems are directly registered in the blockchain, and therefore it has been difficult to move the storage location of content data (e.g., move content data from a location-oriented data management system to a content-oriented data management system) in response to various needs. In view of the above problems, in the system according to the present embodiment, a resource identifier is assigned regardless of the content data storage location, metadata that includes the resource identifier is generated, and token data that includes an identifier of that metadata is registered in a blockchain, thus solving some or all of the above problems.

<System Configuration>

FIG. 1 is a schematic diagram showing the configuration of a system according to the present embodiment. The system according to the present embodiment includes an information processing device 1 and a plurality of user terminals 9, which can communicate with each other by being connected to a network. Also, the system according to the present embodiment is connected to a first data management system 5, a second data management system 6, and a blockchain 7.

The information processing device 1 is a computer that includes a CPU (Central Processing Unit) 11, a ROM (Read Only Memory) 12, a RAM (Random Access Memory) 13, a storage device 14 such as an EEPROM (Electrically Erasable and Programmable Read Only Memory) or an HDD (Hard Disk Drive), a communication unit 15 such as an NIC (Network Interface Card), and the like. However, omissions, replacements, and additions can be made to the specific hardware configuration of the information processing device 1 as appropriate according to the mode of implementation. Also, the information processing device 1 is not limited to being a device provided in a single housing. The information processing device 1 may be realized by a plurality of devices using so-called cloud technology or distributed computing technology, for example.

The user terminals 9 are terminal devices used by users. The user terminals 9 are each a computer that includes a CPU, a ROM, a RAM, a storage device, a communication unit, an input device, an output device, and the like (not shown). However, omissions, replacements, and additions can be made to the specific hardware configuration of the user terminal 9 as appropriate according to the mode of implementation. Also, the user terminal 9 is not limited to being a device provided in a single housing. The user terminal 9 may be realized by a plurality of devices using so-called cloud technology or distributed computing technology. Users connect to the information processing device 1 via the user terminals 9 in order to perform system management, perform NFT and FT management, participate in marketplaces, and make NFT transactions, for example.

The first data management system 5 manages data for content pertaining to NFTs (data that is the actual content entity; hereinafter referred to as "content data"). In the present embodiment, the first data management system 5 is a so-called location-oriented data management system, and the data managed by the first data management system 5 is referenced by specifying information indicating the location where data is stored (information called a URL, an address, or a file path, for example). More specifically, the present embodiment describes an example in which the first data management system 5 is a Content Delivery Network (CDN).

Similarly to the first data management system 5, the second data management system 6 manages content data. However, unlike the first data management system 5, the second data management system 6 is a so-called content-oriented data management system, and data managed by the second data management system 6 is referenced by specifying a unique identifier (information called a URI, a URN, or a CID, for example) that is given to the data regardless of the location where the data is stored. More specifically, the present embodiment describes an example in which the second data management system 6 is an InterPlanetary File System (IPFS).

The blockchain 7 is used for registering data in order to issue and trade NFTs and FTs. In the present embodiment, the blockchain is a so-called private blockchain in which only users having an account managed by a predetermined management entity (e.g., users having a user ID issued by an NFT marketplace administrator) can participate. For this reason, in the present embodiment, the wallet of each user (including NFT purchasers) is associated with the corresponding account for management. Here, a wallet address is appropriately generated for each user's wallet. However, the type of blockchain that can be used to implement the technology according to this disclosure is not limited to this, and it is also possible to use a consortium blockchain, in which only users having accounts corresponding to any of various specified management entities can participate, or use a public blockchain. Also, the same blockchain may be used for NFT issuing, NFT trading, FT issuing, and FT trading, or different blockchains may be additionally used.

Figure 2:
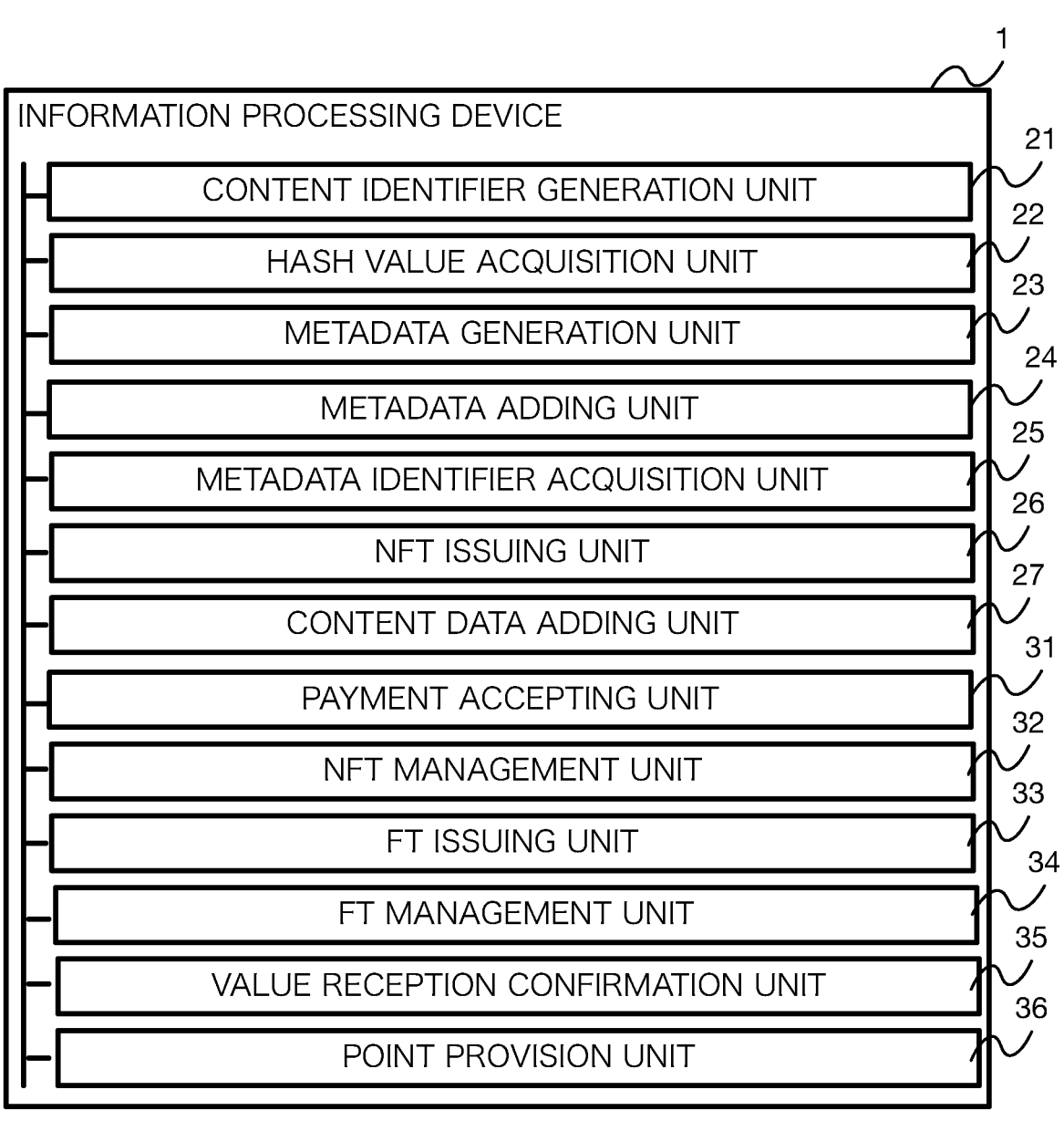
FIG. 2 is a diagram showing an overview of a functional configuration of an information processing device according to an embodiment.

FIG. 2 is a diagram showing an overview of the functional configuration of the information processing device 1 according to the present embodiment. Programs recorded in the storage device 14 are read out to the RAM 13 and executed by the CPU 11 to control pieces of hardware provided in the information processing device 1, and thus the information processing device 1 functions as an information processing device that includes a content identifier generation unit 21, a hash value acquisition unit 22, a metadata generation unit 23, a metadata adding unit 24, a metadata identifier acquisition unit 25, an NFT issuing unit 26, a content data adding unit 27, a payment accepting unit 31, an NFT management unit 32, an FT issuing unit 33, an FT management unit 34, a value reception confirmation unit 35, and a point provision unit 36. Also, in the present embodiment and other embodiments described later, the functions provided in the information processing device 1 are executed by the CPU 11, which is a general-purpose processor, but some or all of such functions may be executed by one or more dedicated processors.

The content identifier generation unit 21 generates a content identifier for content data in accordance with a content identifier generation procedure for the content-oriented second data management system 6 (IPFS), regardless of whether or not the content data is to be added to the second data management system 6. In other words, in the system according to the present embodiment, even if content data is managed by the location-oriented first data management system 5 and at least initially not managed by the content-oriented second data management system 6, a CID is generated in accordance with the IPFS protocol (i.e., by performing a hash operation that incorporates the content data into a key).

The hash value acquisition unit 22 acquires a hash value generated based on a key that contains content data. The hash value acquired here may have been calculated by the information processing device 1, or may have been calculated by another computer. Also, the hash value may be calculated with use of an algorithm different from the algorithm used for CID generation performed by the content identifier generation unit 21, or an algorithm similar to the CID generation algorithm, or the same algorithm may be used for CID generation and hash value calculation.

The metadata generation unit 23 generates content metadata that includes the hash value acquired by the hash value acquisition unit 22, an electronic signature generated using the hash value and a predetermined secret key, and a resource identifier that is to be referenced for content data acquisition. In the present embodiment, a uniform resource identifier (URI), which includes a content identifier (CID) that uniquely indicates a piece of content, is used as the resource identifier. Also, the predetermined secret key used for the electronic signature may be the secret key of the content provider, or may be another secret key such as the secret key of the system administrator.

The metadata adding unit 24 adds metadata to the second data management system 6. Here, since the second data management system 6 is a content-oriented data management system (an IPFS in the present embodiment) as described above, when metadata is added to the second data management system 6, a metadata identifier (CID) that uniquely identifies that metadata is issued by the second data management system 6.

The identifier (CID) issued by the content-oriented second data management system 6 when metadata is added to the second data management system 6 is acquired by the metadata identifier acquisition unit 25 as a metadata identifier uniquely indicating that metadata.

The NET issuing unit 26 issues an NFT (adds the NFT to the owner's wallet) linked to metadata and content by recording token data that includes a metadata identifier in the blockchain 7. In the present embodiment, with this configuration, the content is indirectly linked to the NFT via the metadata. However, the content may be directly linked to the NET by including a hash value or CID of the content in the token data. Also, in the present embodiment, it is possible to issue multiple NFTs that are linked to one piece of content. In this case, the NFT issuing unit 26 issues multiple NFTs linked to one piece of content by employing a method in which multiple pieces of metadata that include a combination of the same content identifier (CID) and different additional data (e.g., different serial numbers) are generated, and pieces of token data that respectively correspond to the generated metadata pieces are recorded in the blockchain 7, or a method in which multiple pieces of token data that include a combination of the common metadata identifier and additional data which is differ from each other (e.g., different serial numbers) are recorded in the blockchain 7, for example.

The content data adding unit 27 uses a content identifier generated by the content identifier generation unit 21 to add content data managed by the location-oriented first data management system 5 to the content-oriented second data management system 6, in accordance with an instruction from the administrator. Note that content data may have already been added to the second data management system 6 in the first place.

The payment accepting unit 31 accepts payment of a payment value from a purchaser via a payment means linked to the account of the purchaser. Here, the value used for payment of the NFT purchase price by the purchaser can be legal currency or electronic value such as points issued by an administrator or electronic money, for example. There are no limitations on the type of value used for the NFT purchase price payment, and it is possible to use cryptocurrencies such as Bitcoin and Ethereum. Also, in the present embodiment, credit cards, debit cards, electronic money, and the like are envisioned as a payment means when paying with legal currency, and a point management system managed by a point administrator is envisioned as a payment means when paying with points. However, the payment means is not limited to the examples given in the present embodiment, and various payment means that are known or will appear in the future may be adopted, including both prepaid and postpaid payments means. For example, if a cryptocurrency is used for payment, the blockchain network for the applicable cryptocurrency is used as the payment means.

The NFT management unit 32 transfers an NFT corresponding to a product acquired by the user to that user's wallet. Note that in the present embodiment, the product may include predetermined rights or other benefits (points, data, or the like) related to the content linked to the NFT.

In response to the purchase of a product, the FT issuing unit 33 issues an amount of FT (private FT) that corresponds to the amount of the payment value (e.g., Japanese yen or points) paid by the purchaser of the product in the blockchain 7. The FT issued here and managed by the FT management unit 34, which will be described later, is used to indicate the amount of value in the transaction, and is not used as the value itself in the transaction. In other words, even if a cryptocurrency, which is another type of FT, is used to purchase a product, the FT issuing unit 33 issues an FT whose amount corresponds to the amount of the payment value (e.g., Bitcoin or Ethereum) in blockchain 7. Also, in the present embodiment, an example is described in which FTs issued by the FT issuing unit 33 are first transferred to the system administrator's wallet and then transferred to corresponding wallets, but FTs are not limited to being transferred to the system administrator's wallet upon being issued, and instead may be issued to the wallets of the users who made a purchase.

When a user is to receive at least part of a payment value, the FT management unit 34 adds (records in the blockchain 7), to the wallet of that user, an amount of FT that corresponds to the amount of value that the user is to receive, out of the total value of the FT issued by the FT issuing unit 33. More specifically, the FT management unit 34 performs processing such that a first portion of the issued FT is added to the wallet of the product seller, a second portion is added to the wallet of the system administrator or transitioned to an unusable state (so-called cryptocurrency coin burning or cryptocurrency coin flagging), and a third portion is added to the wallet of the right holder of the product (the IP holder, which is not limited to being the business that made the primary sale of the product, and may also include the individual who has a copyright or a right of likeness, for example). Here, the first portion of the FT corresponds to the amount of value that the seller is to receive (as the sales amount of the product sale) out of the payment value, the second portion corresponds to the amount of payment value that the system administrator is to receive out of the payment value, and the third portion corresponds to the amount of value that the right holder is to receive (as a royalty) out of the payment value. Note that in the present embodiment, the addition of a token to a wallet means that the token is linked, transmitted, moved, or transferred to the wallet address that corresponds to the wallet.

The value reception confirmation unit 35 confirms that a user who is to receive at least part of a payment value is scheduled to receive or has received the amount of value corresponding to the FT added to the wallet of the user. When the reception of value (may be scheduled reception or completed reception) has been confirmed by the value reception confirmation unit 35, an amount of FT that corresponds to the amount of value whose reception was confirmed by the value reception confirmation unit 35 out of the FT issued to the user's wallet is transitioned to an unusable state or transferred to a wallet other than the user's wallet by the FT management unit 34.

The point provision unit 36 adds, to a purchaser's account, points that can be used as at least part of a payment value when purchasing a product. Also, when a first product has been purchased, the point provision unit 36 may add points that can be used as at least part of a payment value for a second product that is different from the first product. For example, when an NFT is purchased in a marketplace, the point provision unit 36 adds an amount of points calculated based on the purchase price (e.g., points equivalent to 1% of the purchase price) to the purchaser's account. The points given here can be used as part or all of a purchase price when purchasing another NFT, and a certain amount of points specified by the user from among the point balance linked to the user's account can be applied to an NFT purchase price by the payment accepting unit 31.

<Processing Flow>

Next, a flow of processing executed in the system according to the present embodiment will be described. Note that the specific content and processing sequence of the processing described below are examples for implementing the invention of this disclosure. The specific processing content and processing sequence may be appropriately selected according to the embodiment of this disclosure.

Figure 3:
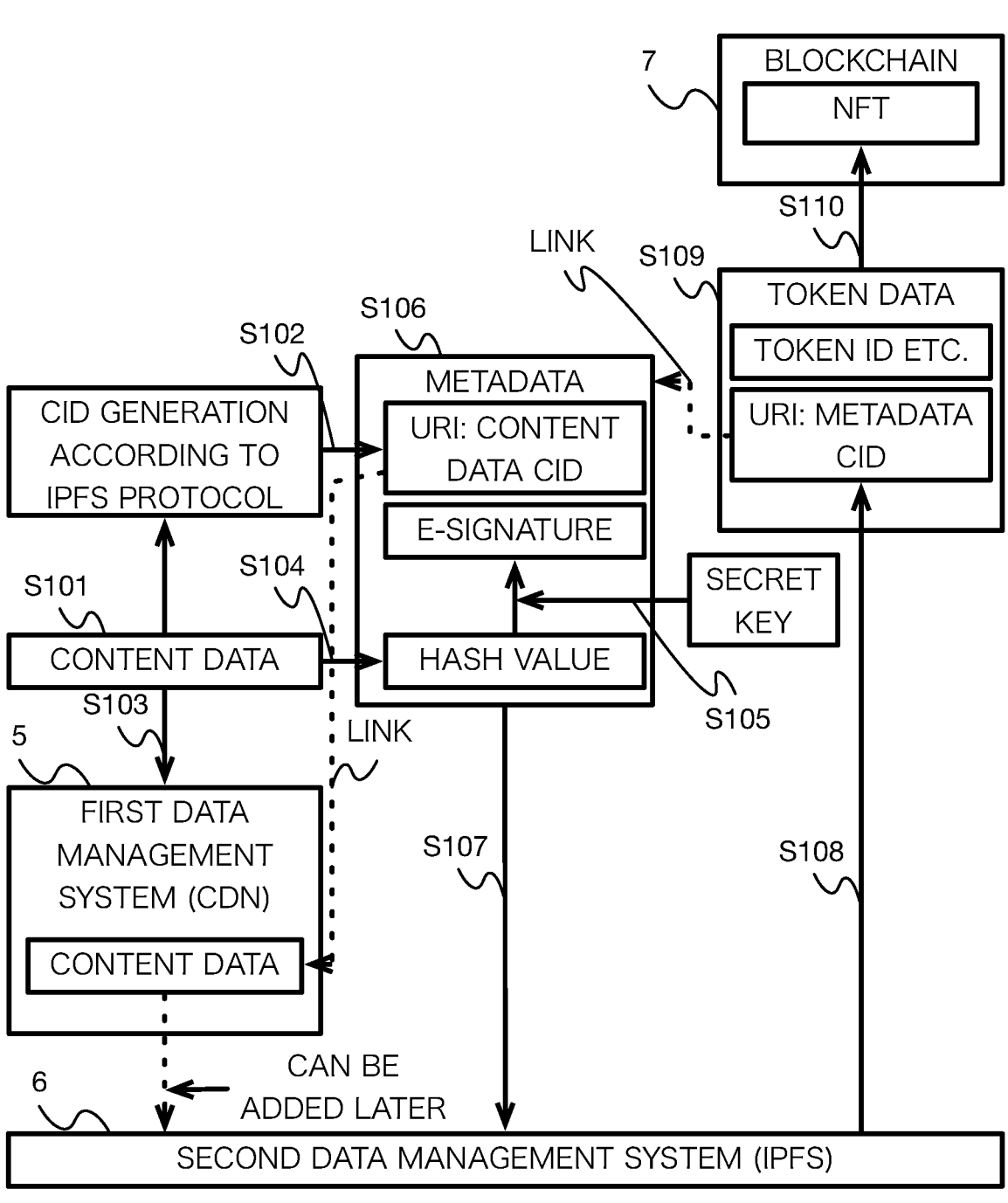
FIG. 3 is a schematic diagram showing an example of a flow of NFT issuing processing according to an embodiment.

FIG. 3 is a schematic diagram showing an example of the flow of NFT issuing processing according to the present embodiment. The processing shown in this schematic diagram is executed when the system receives content data that is planned to be associated with an NFT to be sold.

In steps S101 to $103, a CID is generated in accordance with content data. The information processing device 1 receives content data from a content provider (step S101). Here, there are no limitations on the content types and data formats that can be handled by this system. Examples of content that can be handled include moving images, still images, audio (any kind of audio is acceptable, including music, environmental sounds, human voices, animal cries, and so on), three-dimensional models, drawings, text, in-game objects (e.g., in-game characters, items, or cards), and tickets, and there are no limitations on the data format used when storing such content as data.

When the content data is input from the content provider, the content identifier generation unit 21 generates a CID in accordance with the IPFS protocol regardless of whether the content data is to be added to the IPFS (second data management system 6) (step S102). For this reason, the CID includes a hash value of the content data calculated using a predetermined hash algorithm. In the present embodiment, an example will be described in which the content data is not initially added to the IPFS, but rather is stored in the conventional location-oriented first data management system 5 (a CDN in the example shown in the present embodiment). In the present embodiment, the information processing device 1 stores the content data in the first data management system that uses a CDN (step S103). Also, even in the case where the content data is added to the location-oriented first data management system 5, the CID generated in step S102 can be used as an index (e.g., a file name or a search key) that indicates the content data in the location-oriented first data management system 5. Thereafter, the processing proceeds to step S104.

In steps S104 to S106, metadata is generated. The hash value acquisition unit 22 calculates a hash value using a predetermined hash algorithm based on the key containing the content data obtained in step S101 (step S104). Then, the metadata generation unit 23 creates an electronic signature using the hash value calculated in step S104 and the secret key of the content provider (step S105). Details of the electronic signature processing are omitted here because conventional or future electronic signature technology may be used. Note that the public key corresponding to the secret key used here is published on the marketplace. This allows anyone who can obtain the public key to confirm the validity of the content. When the electronic signature has been created, the metadata generation unit 23 generates content metadata that includes the hash value calculated in step S104, the electronic signature generated in step S105, and a URI (resource identifier) to be referenced when acquiring the content data (step S106). Here, the URI in the metadata includes the CID generated according to the IPFS protocol in step S102. Accordingly, even if content data is added to IPFS in the future, it will be possible to obtain the content data from the IPFS by specifying the URI. Subsequently, the processing proceeds to step S107.

In steps S107 and S108, the metadata is saved. The metadata adding unit 24 adds the metadata generated by the processing up to step S106 to the IPFS (step S107). When data is uploaded to the IPFS, data larger than a predetermined size is divided into chunks (chunking), and a content identifier (CID) that uniquely indicates the data to be added (here, metadata) is issued using a hash value obtained using the data to be added (here, metadata) as the key. This CID serves as a permanent record of existence at the time the data was added. Note that as described above, the CID is based on a hash value of the added data, the same CID is issued for data that is exactly the same, and the CID remains unchanged for the same data. Then, the metadata identifier acquisition unit 25 acquires the CID issued by IPFS as a metadata CID (step S108), which will be referred to as a "metadata CID" for distinction from the content data CID generated in step S102. Subsequently, the processing proceeds to step S109.

In steps S109 and S110, an NFT is issued by recording the token data in the blockchain 7. The NFT issuing unit 26 creates token data that includes the metadata CID (step S109). Then, the NFT issuing unit 26 records the created token data directly in the blockchain 7, and thus the NFT linked with the metadata and content is issued and assigned to the owner's wallet (step S110). Subsequently, the processing shown in this diagram ends.

Figure 4:
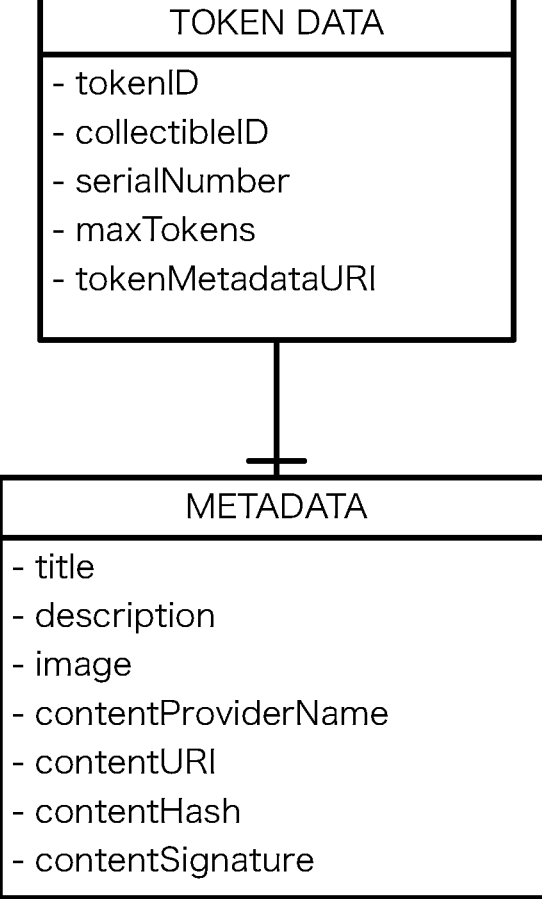
FIG. 4 is a diagram showing an example of items that can be adopted as metadata and token data in an embodiment.

FIG. 4 is a diagram showing an example of items that can be used for metadata and token data in the present embodiment, including the token data listed below. Note that the following examples are envisioned for a token in the form of a collectible, in which case multiple NFTs are issued for one piece of content.

tokenID (token ID)

collectibleID (collectible ID)

serialNumber (serial number, which allows multiple NFTs linked with one piece of content to be issued by setting different serial numbers along with one collectible ID for one piece of content)

maxTokens (maximum number of NFTs issued for one collectible)

tokenMetadataURI (URI for referencing metadata from an issued NFT; includes metadata CID)

The following are examples of metadata.

title (token title)

description (token description)

image (URL of the content or a thumbnail of the content, accessible by a browser)

contentProviderName (name of content provider)

contentURI (URI for referencing content data; includes CID)

contentHash (hash value of content data)

contentSignature (electronic signature of content data)

Furthermore, in the present embodiment, items such as those listed below may be employed as items included in metadata and/or token data.

royaltyInfo (information used to verify distribution of value as a royalty; includes wallet address and royalty percentage)

externalURL (URL directing user to a service or content webpage)

rarity (rarity of content or NFT)

series (content series information)

Also, metadata and/or token data may further include information on the content provider, information on a performer related to the content, credit information related to intellectual property rights (copyrights, trademark rights, rights of performers, etc.) for the content, group information related to the content, date/time information related to the content, information on a location related to the content (performance venue or the like; may also include the metaverse or a distributed performance), event information related to the content (series or series name of a sports game, performance name, concept, etc.), or the like. Here, examples of performers include actors and musicians, athletes in sports-related content, and members in singer/band content, and examples of groups include team names in sports-related content, group names in singer content, and group names in band content, and examples of the date/time include the date and time of the release of content and the date and time of the recording of content. These pieces of information may be included as independent items in the metadata and/or the content data, or may be described in comprehensive items such as "description" and "series" described above. The performer information may also include the role of the performer in the content (position in sports-related content (such as "pitcher"), position in singer content, or assigned instrument in band content, for example).

According to the NFT issuing processing described above, a content data CID generated according to the IPFS protocol is stored in metadata, and a CID of that metadata is recorded in the blockchain 7 in the form of being included in token data, and therefore even if content data that had not been added to the IPFS when the NFT was issued is added to the IPFS at a later time by the content data adding unit 27, the CID issued by the IPFS will be the same as the CID generated in step S102, and it is possible to verify the identity of the content data without influencing the generated NFT. In other words, according to the NFT issuing processing described above, even if content data linked to the NFT was not initially added to the IPFS, that content data can be added to the IPFS at any timing.

Figure 5:
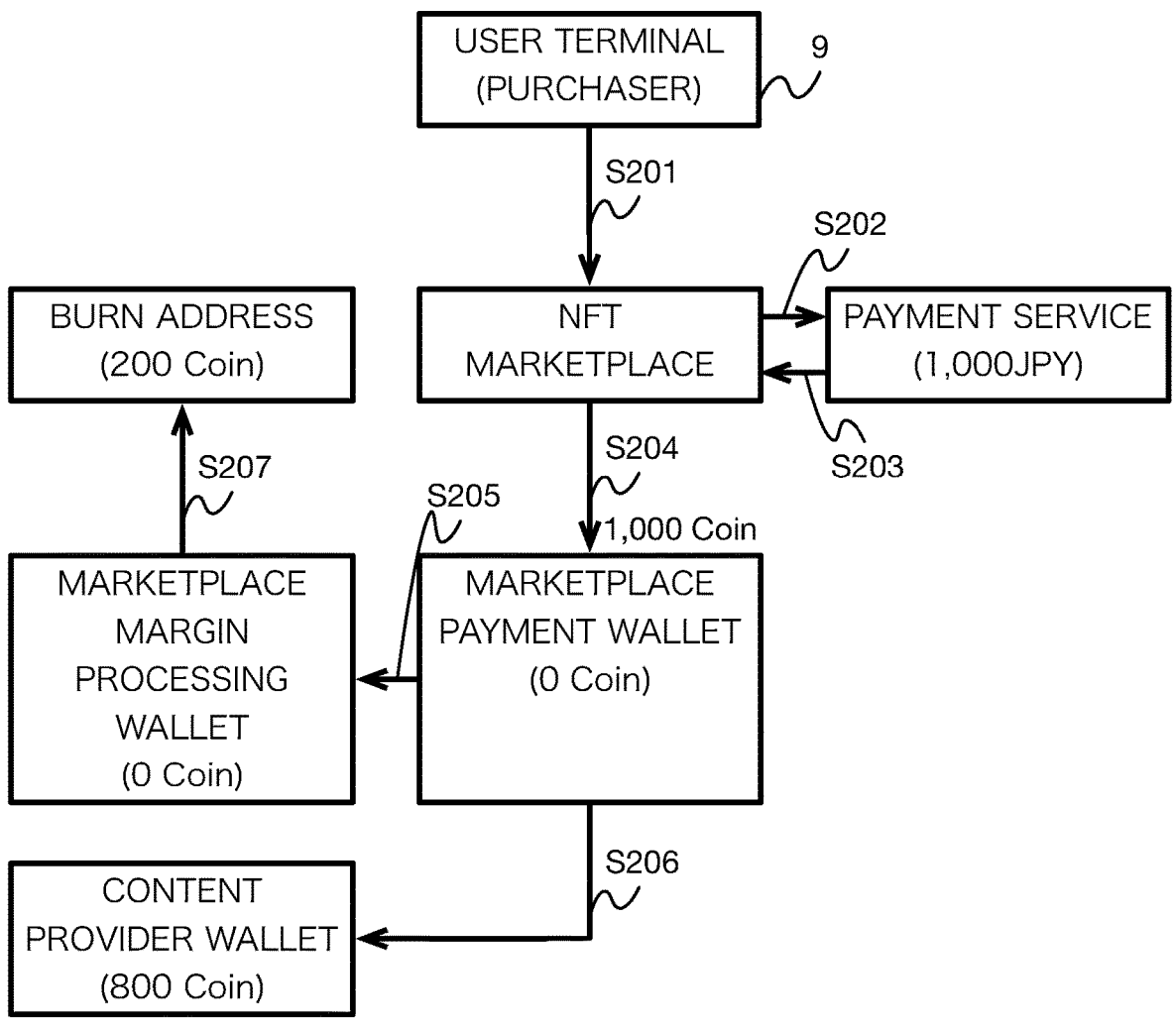
FIG. 5 is a schematic diagram showing a flow of NFT primary sales processing according to an embodiment.

FIG. 5 is a schematic diagram showing an example of the flow of NFT primary sales processing according to the present embodiment. The processing shown in this schematic diagram is executed when a purchase request is transmitted from the user terminal 9 of a user who wishes to purchase an NFT. Note that the amounts of value and FT amounts shown in the accounts or wallets in the diagram are the amounts of value and FT amounts in those accounts or wallets after completion of the processing shown in this diagram.

In steps S201 to S203, an NFT purchase request is received, and payment of a payment value is performed. When an NFT is listed on a marketplace by a content provider, and then a seller (here, the content provider) and a purchaser agree on a price for the NFT, the purchaser transmits a request to purchase one or more NFTs to the marketplace managed by the information processing device 1 and performs a payment procedure. Note that the number of NFTs that the purchaser can purchase at one time is not limited to one, and the purchaser may purchase more than one NET at a time. Additionally, multiple NFTs may be included in a pack created by the seller.

Here, there are no limitations on the method of determining the price, and examples of methods that can be used as appropriate include a method in which a purchase can be made if the purchaser agrees to a price presented in advance by the seller, and a method in which the price changes until the seller and the purchaser agree upon a price, as in an auction or the like. The payment accepting unit 31 accepts the payment of the payment value by the purchaser via a payment means linked to the account of the purchaser (step S201). The value paid by the purchaser (in the example shown in the figure, 1000 Japanese yen, which is the legal currency of Japan) is sent to the payment service (step S202), and the management system sends the information processing device 1 that manages the marketplace a notification that the payment of value (settlement) has been completed (step S203). Subsequently, the processing proceeds to step S204. Here, the payment service may be a financial system capable of managing or linking accounts of system administrators. Note that the payment of value to the payment service (e.g., payment of legal currency) may be performed before payment in step S202, or may be performed after payment as with deferred payment or the like.

In steps S204 to S207, FT-based value management is executed. The FT issuing unit 33 issues an amount of FT (1000 Coin in the example shown in the figure; note that the term "coin" will also be used for the name of the FT issued in the present embodiment, but there are no limitations on the name of the FT pertaining to this disclosure) that corresponds to the amount of value paid in step S201 by the purchaser (1000 yen in the example shown in the figure) to a payment wallet (system administrator wallet) in the marketplace (step S204). Then, the FT management unit 34 adds, to a margin processing wallet of the marketplace, an amount of FT (200 Coin, due to the set margin of 20% in the illustrated example) that corresponds to the amount of value to be received by the system administrator from the issued FT (step S205), and adds, to the wallet of the content provider, an amount of FT (800 Coin in the illustrated example) that corresponds to the amount of value to be received by the seller and right holder of the product, which is the seller of the product (step S206).

Along with the primary sales processing, the NFT management unit 32 transfers the NFT related to the purchased product from the seller's wallet to the purchaser's wallet. At this time, similarly to the processing in steps S605 to S607 of later-described secondary sales processing (see FIG. 9), in the NFT transfer, an amount of FT that corresponds to the amount of value to be received by the seller and/or right holder may be simultaneously and inseparably added to the wallet of the seller and/or right holder (steps S205 and S206). However, the timing of NFT movement is not limited to the example shown here. Then, the FT management unit 34 burns the FT that was added to the margin processing wallet for transition to an unusable state (step S207), and the processing shown in this diagram ends.

Figure 6:
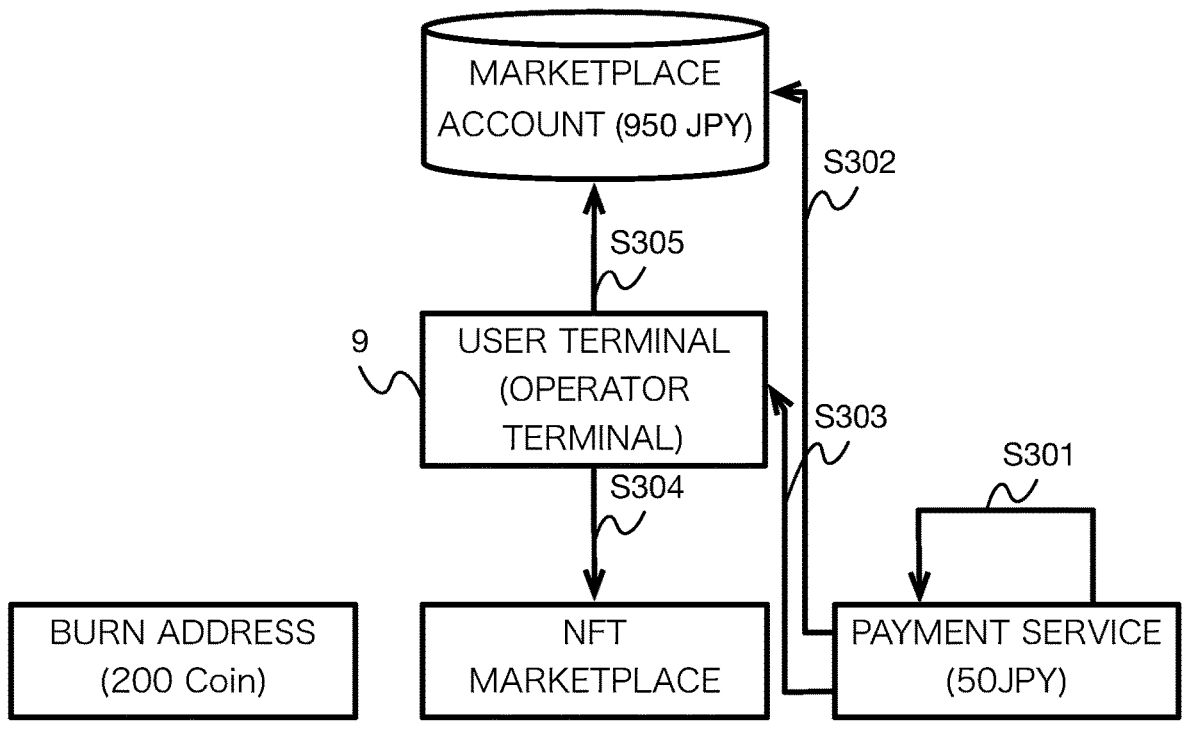
FIG. 6 is a schematic diagram showing an example of a flow of periodic aggregation processing according to an embodiment.

FIG. 6 is a schematic diagram showing an example of the flow of periodic aggregation processing according to the present embodiment. The processing shown in this schematic diagram is executed once every predetermined period (e.g., once every month). Note that the amounts of value and FT amounts shown in the accounts or wallets in the diagram are the amounts of value and FT amounts in those accounts or wallets after completion of the processing shown in this diagram.

First, in step S301, the information processing device 1 subtracts a necessary fee (50 yen in the illustrated example) from the value that was paid by the purchaser (1000 yen in the illustrated example) and sent to the payment service in step S202 in the primary sales processing described with reference to FIG. 5, and then the information processing device 1 remits the remaining amount (950 yen in the illustrated example) to the marketplace account (step S302). Subsequently, the processing proceeds to step S303.

The information processing device 1 notifies the user terminal 9 of the administrator (hereinafter referred to as the "operator terminal") of the completion of remittance (step S303). The operator terminal that received the notification of the completion of the remittance acquires, from the information processing device 1 that manages the marketplace, sales records that includes product names, content provider names, selling prices, payment IDs, and the like for the predetermined period (e.g., the corresponding month) (step S304). Also, the information processing device 1 performs authentication for the amount remitted to the marketplace account in step S302 with the system (e.g., bank system) that manages the marketplace account (step S305). Subsequently, the processing shown in this diagram ends.

Figure 7:
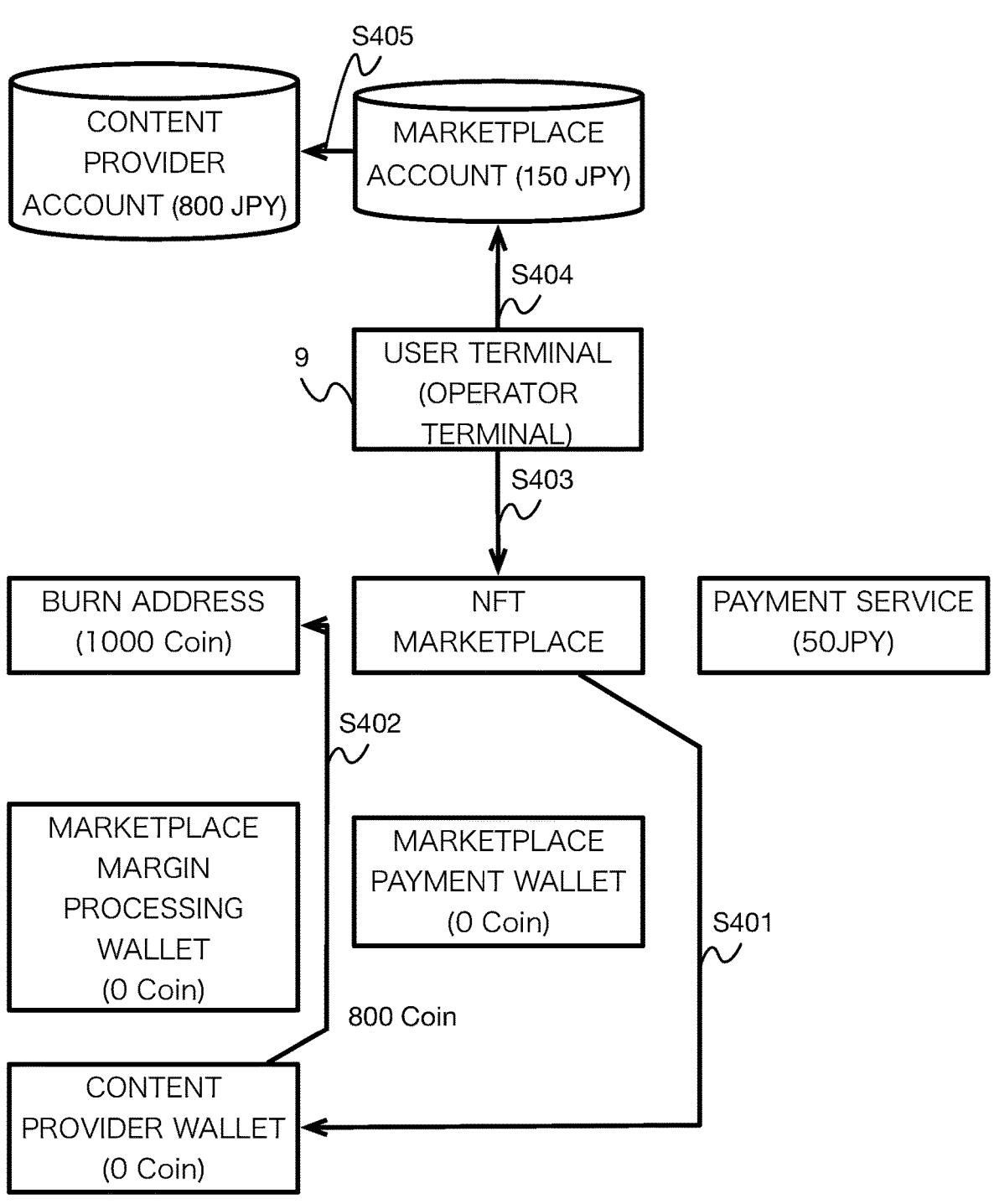
FIG. 7 is a schematic diagram showing an example of a flow of periodic remittance processing according to an embodiment.

FIG. 7 is a schematic diagram showing an example of the flow of periodic remittance processing according to the present embodiment. The processing shown in this schematic diagram is executed one time every predetermined period (e.g., once a month) when the periodic aggregation processing described with reference to FIG. 6 has been completed. Note that the amounts of value and FT amounts shown in the accounts or wallets in the diagram are the amounts of value and FT amounts in those accounts or wallets after completion of the processing shown in this diagram.

First, the value reception confirmation unit 35 references the content provider's wallet and confirms the scheduled reception of the amount of value corresponding to the FT added to the content provider's wallet by the product seller and right holder (800 yen in the illustrated example), and generates a payment list for remittance of the actual value to the product seller and right holder (step S401). Note that although "0 Coin" is shown in the wallet of the content provider after the processing is complete in FIG. 7, "800 Coin" was added at the time of confirmation in step S401 (see FIG. 6), and it is understood that the content provider is scheduled to receive 800 yen. Here, the payment list is a list that includes the name of the content provider, the payment amount (800 yen), payee-related information such as an account, and the like. When the reception of value (here, scheduled reception) has been confirmed in step S401, the FT management unit 34 burns an amount of FT (800 Coin in the illustrated example) that corresponds to the amount of value for which reception was confirmed (800 yen in the illustrated example) in step S401 from the FT given to the content provider's wallet, for transition to an unusable state (step S402). Subsequently, the processing proceeds to step S403.

The operator terminal acquires the payment list for the predetermined period (in the present embodiment, the corresponding month) from the information processing device 1 (step S403), and in accordance with the acquired payment list, instructs the bank system to remit the value that is to be received by the seller or right holder of the product (800 yen in the illustrated example) to the marketplace account or the content provider's account (step S404). Here, the value remaining in the marketplace account after remittance (in the illustrated example, 150 yen, which is the result of the 800 yen remitted to the content provider's account being subtracted from the 950 yen deposited in the account in FIG. 6) is the value to be received by the system administrator. When the remittance of the instructed value is complete (step S405), the processing shown in this diagram ends.

Figure 8:
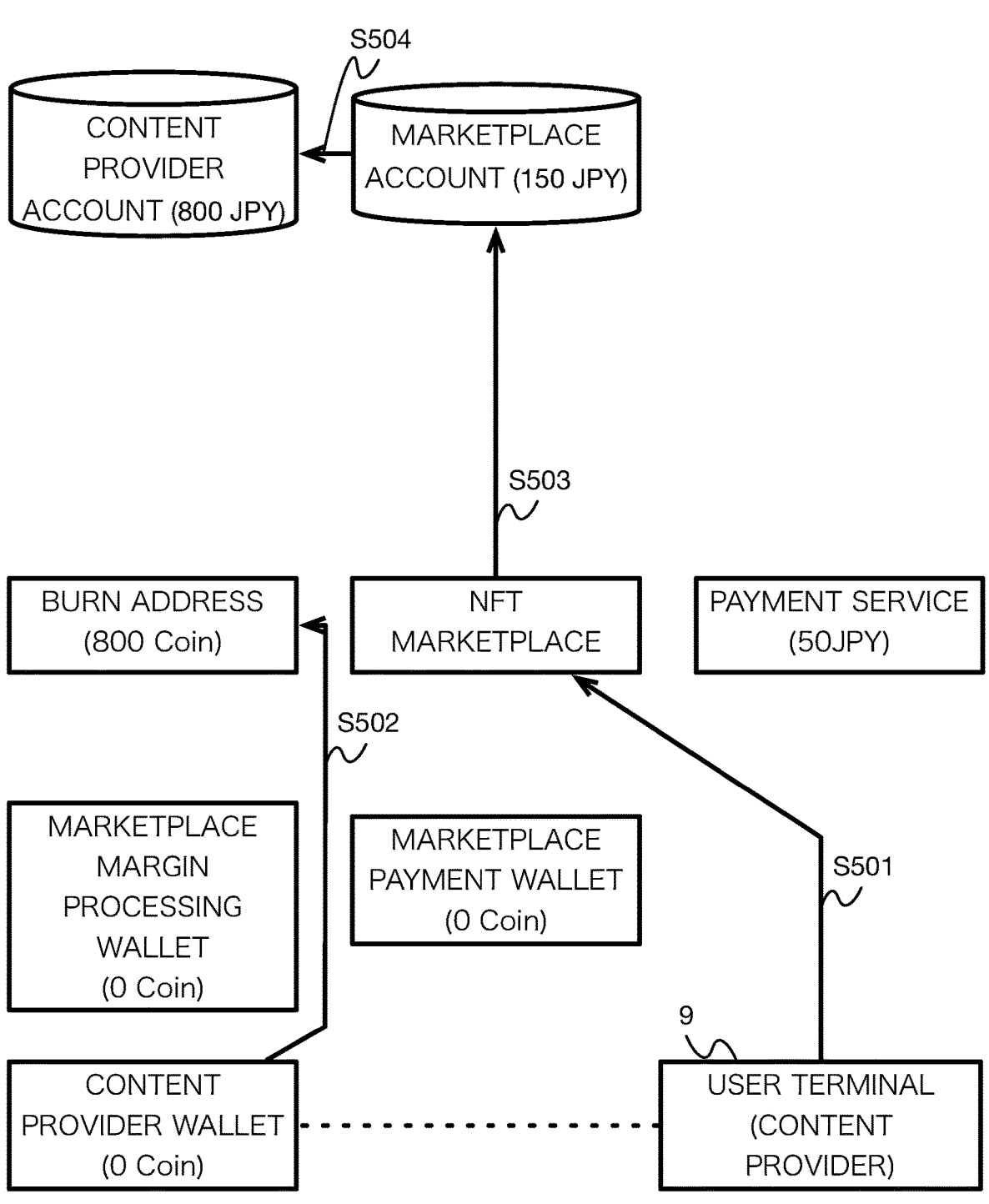
FIG. 8 is a schematic diagram showing an example of a flow of on-demand remittance processing according to an embodiment.

FIG. 8 is a schematic diagram showing an example of the flow of on-demand remittance processing according to the present embodiment. The processing shown in this schematic diagram is executed when a value withdrawal request is transmitted from the user terminal 9 of the content provider. Note that the amounts of value and FT amounts shown in the accounts or wallets in the diagram are the amounts of value and FT amounts in those accounts or wallets after completion of the processing shown in this diagram.

First, the information processing device 1 receives a withdrawal request from the user terminal 9 of the content provider (step S501). Here, the value reception confirmation unit 35 reference the content provider's wallet to confirm the scheduled reception of an amount of value corresponding to the amount of FT added to the content provider's wallet by the product seller and right holder (800 yen in the illustrated example). Note that although "0 Coin" is shown in the content provider's wallet after processing is complete in FIG. 8, "800 Coin" has been added at the time of confirmation in step S501 (see FIG. 6), and it is understood that the content provider is scheduled to receive 800 yen. Then, when the withdrawal request from the content provider is received, the FT management unit 34 burns an amount of FT amount (800 Coin in the illustrated example) that corresponds to the amount of value in the withdrawal request (800 yen in the illustrated example) in step S501 from the FT added to the content provider's wallet, for transition to an unusable state (step S502). Subsequently, the processing proceeds to step S503.

In accordance with the withdrawal request received in step S501, the information processing device 1 instructs the bank system to remit the value to be received by the product seller and the right holder (800 yen in the illustrated example) from the marketplace account to the content provider's account (step S503). Here, the value remaining in the marketplace account after remittance (in the illustrated example, 150 yen, which is the result of the 800 yen remitted to the content provider's account being subtracted from the 950 yen deposited in the account in FIG. 6) is the value to be received by the system administrator. When the remittance of the instructed value is complete (step S504), the processing shown in this figure ends.

Figure 9:
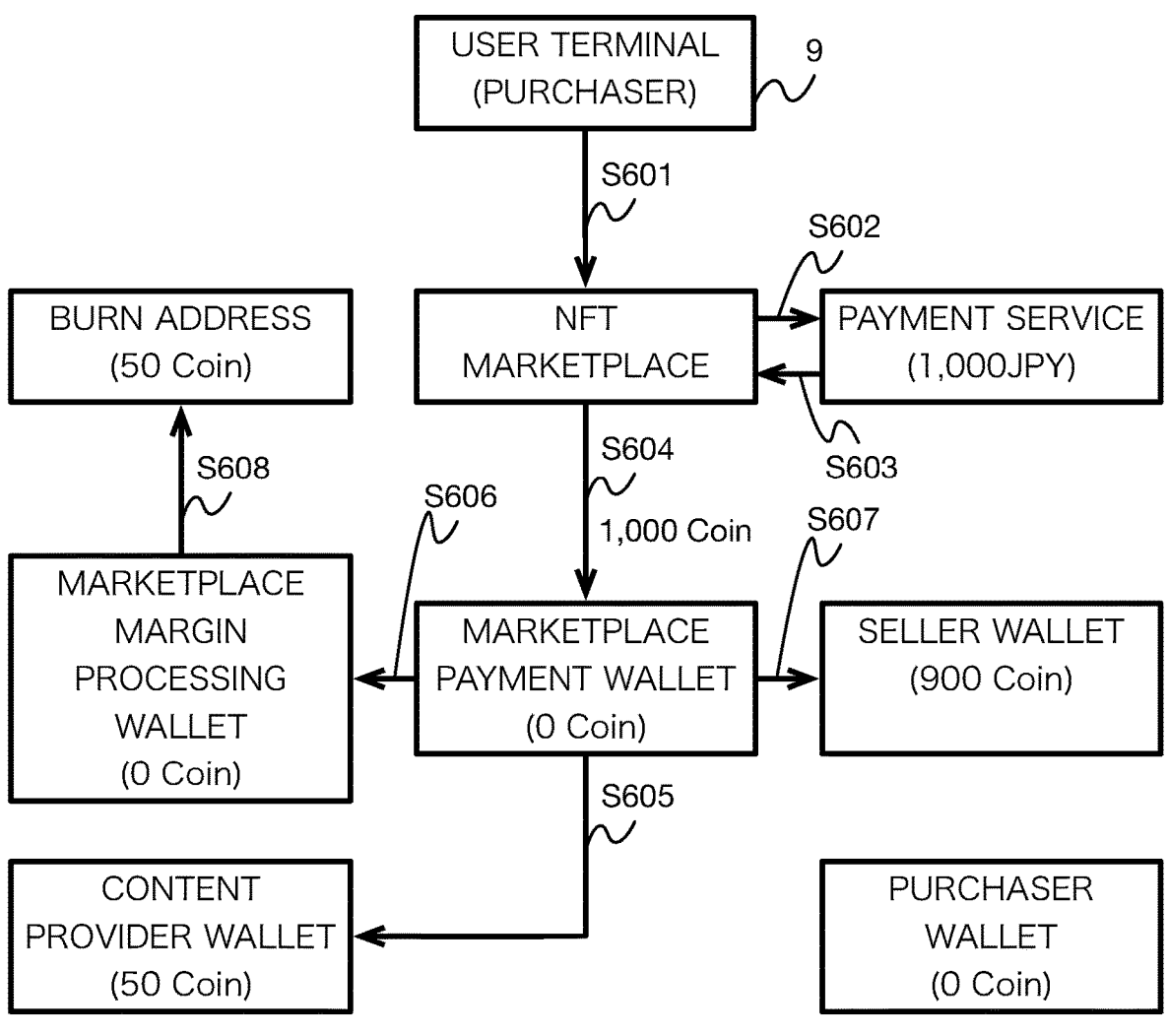
FIG. 9 is a schematic diagram showing an example of a flow of NFT secondary sales processing according to an embodiment.

FIG. 9 is a schematic diagram showing an example of NFT secondary sales processing according to the present embodiment. The processing shown in this schematic diagram is executed when a purchase request is transmitted from the user terminal 9 of a user who wishes to purchase an NFT. Note that the amounts of value and FT amounts shown in the accounts or wallets in the diagram are the amounts of value and FT amounts in those accounts or wallets after completion of the processing shown in this diagram.

In steps S601 to S603, an NFT purchase request is received and payment of a payment value is performed. When an NFT is listed on a marketplace by a seller, and the seller (here, the user who purchased the NFT from the content provider or another user) and a purchaser agree on a price for the NFT, the purchaser then transmits a request to purchase the NFT to the information processing device 1 and performs a payment procedure. Note that there are no limitations on the method of determining the price, there are no limitations on the type of value used for payment of the NFT purchase price, and there are no limitations on the payment means, similarly to the primary sales processing described with reference to FIG. 5. The payment accepting unit 31 accepts payment of the payment value by the purchaser via a payment means linked to the purchaser's account (step S601). The value paid by the purchaser (1000 yen in the illustrated example) is sent to the payment service (step S602), and the information processing device 1 is notified that the value payment was made (step S603). Subsequently, the processing proceeds to step S604. Note that the payment of value to the payment service (e.g., payment of legal currency) may be performed before payment in step S602, or may be performed after payment as with deferred payment or the like.

In steps S604 to S608, FT-based value management is executed. The FT issuing unit 33 sends an amount of FT (1000 Coin in the illustrated example) that corresponds to the amount of value paid by the purchaser in step S601 (1000 yen in the illustrated example) to the marketplace payment wallet (step S604). Then, the FT management unit 34 adds, to the wallet of the content provider (right holder of the product), an amount of FT (50 Coin, due to the set royalty of 5% in the illustrated example) that corresponds to the amount of value to be received by the content provider from the issued FT (step S605), adds, to a margin processing wallet of the marketplace, an amount of FT (50 Coin, due to the set margin of 5% in the illustrated example) that corresponds to the amount of value to be received by the system administrator from the issued FT (step S606), and adds, to the wallet of the user (product seller), an amount of FT (900 Coin in the illustrated example) that corresponds to the amount of value to be received by the product seller from the issued FT (step S607). Note that in the present embodiment, the royalty and/or margin may be calculated by referencing "royaltyInfo" included in the metadata and/or token data.

Here, the NFT management unit 32 transfers the NFT related to the purchased product from the seller's wallet to the purchaser's wallet. At this time, it is preferable that the transfer of the NET is performed simultaneously and inseparably with the addition of the FT to be received by the seller and/or the right holder to the wallet of the seller and/or the right holder (steps S605 to S607). Specifically, in the transaction for transferring the NFT on the blockchain 7, the NET management unit 32 and the FT management unit 34 use both the FT transferred to the seller's wallet and the NFT transferred from the seller to the purchaser as input for indicating the current owner and output for indicating the transfer destination, and thus the NFT is not transferred to the purchaser unless the seller receives the FT. At this time, the NFT management unit 32 and the FT management unit 34 can complete the transaction by publishing electronic signatures for input and output for both the seller and the purchaser to the network. The NFT management unit 32 and/or the FT management unit 34 may process a transaction for NFT and/or FT transferal based on the UTXO (Unspent Transaction Output) transaction format. Such transaction processing on the blockchain 7 is effective for increasing transaction security particularly in C2C transactions (including secondary transactions in which NFTs that have been sold are further exchanged between users, as well as transactions in which ordinary users sell NFTs as content providers). Note that such transaction processing on the blockchain 7 may also be employed in transactions other than C2C transactions (e.g., B2C transactions). In other words, in the primary sales processing that was described with reference to FIG. 5 as well, the transfer of the NFT is performed simultaneously with and inseparably from the transfer of the FT to be received by the seller and/or right holder to the wallet of the seller and/or right holder. Subsequently, the FT management unit 34 burns the FT added to the margin processing wallet for transition to an unusable state (step S608), and the processing shown in this diagram ends.

The aggregation processing and remittance processing that are executed after the end of the secondary sales processing are similar to the corresponding processing described with reference to FIGS. 6 to 8, and thus will not be described here.

Other Effects

According to the technology disclosed in the above embodiment, in order to indicate the amount of value to be paid in a transaction, an FT with the same amount is issued, and the FT is handled in accordance with the actual transfer of value, and therefore the value to be paid in a transaction (e.g., royalty, margin, and seller profit) can be appropriately managed as data. For example, according to the above embodiment, it is possible to use a decentralized (non-centralized) system for data management while also preventing data falsification, and users themselves who participate in a transaction can reference the data (here, the FT) by which the amount of value is managed.

Also, according to the technology disclosed in the above embodiment, even in a situation in which the content provider does not desire to store content in an IPFS, it is possible to provide other options for the storage destination, and the content storage destination can be changed to the IPFS at the request of the content provider or the user (owner, seller, purchaser, or the like). Also, from another point of view, by separating the content data storage location from the metadata storage location and also including an IPFS CID in the metadata, it is possible to obtain an effect of preventing fake NFT generation and tampering by a third party, while also facilitating the transfer of an NFT to another blockchain (e.g., switching from a private NFT to a public NFT (switching to a standard NFT)).

<Variations>

Figure 10:
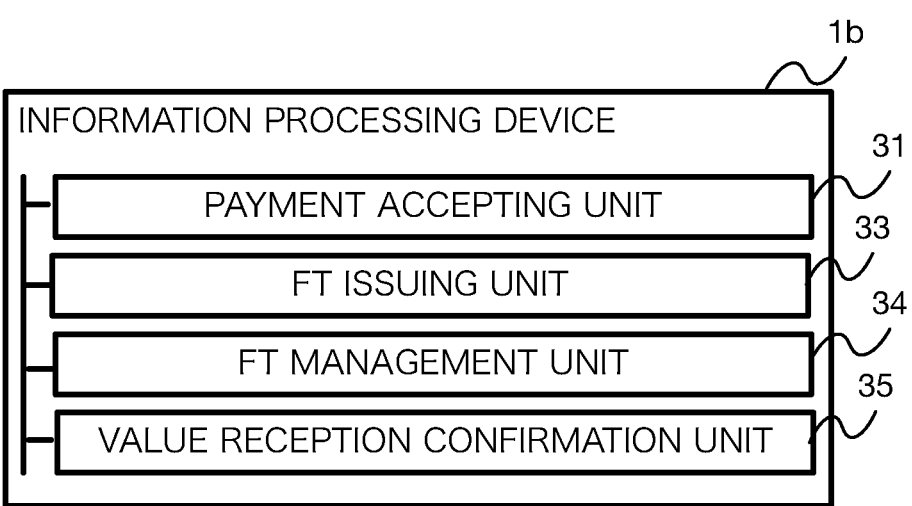
FIG. 10 is a diagram showing an overview of a functional configuration of an information processing device according to a variation.

FIG. 10 is a diagram showing an overview of the functional configuration of an information processing device 1*b* according to a variation. In the above-described embodiment, an example is described in which an FT whose amount corresponds to the amount of value to be paid in a transaction is issued, and processing for handling the FT in accordance with the actual transfer of value is used to manage the value to be paid in an NFT transaction, but the above-described FT-based value management may also be used to manage the value to be paid in a non-NFT transaction, such as a product or service transaction. In this case, with the exception that the trigger for starting the processing is a product or service other than an NFT, the content of the processing performed by the functional units is substantially the same. In the information processing device 1*b*, a program recorded in a storage device is read out to a RAM and executed by a CPU, and hardware provided in the information processing device 1*b* is controlled, and thus the information processing device 1*b* functions as an information processing device that includes the payment accepting unit 31, the FT issuing unit 33, the FT management unit 34, and the value reception confirmation unit 35.

Figure 11:
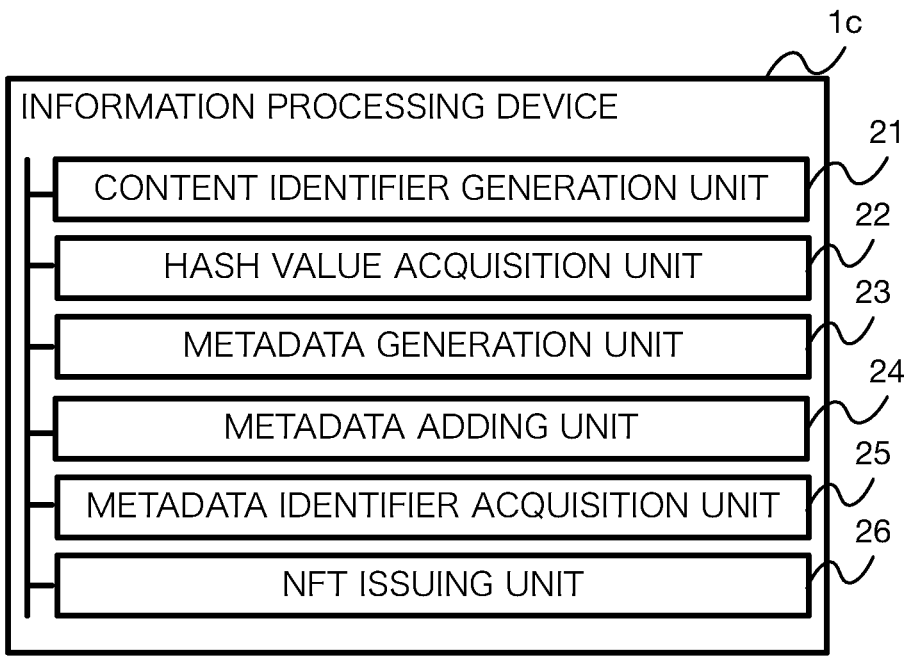
FIG. 11 is a diagram showing an overview of a functional configuration of an information processing device according to another variation.

FIG. 11 is a diagram showing an overview of the functional configuration of an information processing device 1*c* according to another variation. In the above-described embodiment, an example is described in which the processing of generating metadata that includes a resource identifier and registering token data that includes the identifier of the metadata in the blockchain 7 is performed together with the above-described value management, but metadata-related processing can be broadly used for NFT-related technologies. In the information processing device 1*c*, a program recorded in a storage device is read out to a RAM and executed by a CPU, and hardware provided in the information processing device 1*c* is controlled, and thus the information processing device 1*c* functions as an information processing device that includes the content identifier generation unit 21, the hash value acquisition unit 22, the metadata generation unit 23, the metadata adding unit 24, the metadata identifier acquisition unit 25, and the NFT issuing unit 26.

Also, in the above-described embodiment, an example of adding metadata to an IPFS has been described, but a configuration is possible in which, similarly to content data, metadata is also not added to a content-oriented data management system such as an IPFS, but rather is stored in a location-oriented data management system such as a CDN, and only a CID is generated and issued.

Note that although an example of using a blockchain as a distributed ledger has been described in the above embodiment, the distributed ledger that can be used to implement the technology according to this disclosure is not limited to being a so-called blockchain. A distributed ledger other than a blockchain may be used as long as it has the functions and configurations required to implement the technology according to this disclosure.

What is claimed is:

1. An information processing system comprising:
at least one memory configured to store program code;
at least one processor configured to operate as instructed by the program code, the program code including:

content identifier generation code configured to cause at least one of the at least one processor to generate a content identifier for content data in accordance with a content identifier generation procedure for a content-oriented data management system regardless of whether the content data is to be added to the content-oriented data management system;

acquisition code configured to cause at least one of the at least one processor to acquire a hash value generated based on a key containing content data linked to a non-fungible token;

generation code configured to cause at least one of the at least one processor to generate metadata for a content, the metadata including an electronic signature generated using the hash value and a predetermined secret key and a resource identifier referenced when acquiring the content data;

identifying code configured to cause at least one of the at least one processor to acquire a metadata identifier uniquely indicating the metadata;

issuing code configured to cause at least one of the at least one processor to issue the non-fungible token linked to the metadata and the content, by recording token data including the metadata identifier in a blockchain; and storage management code configured to cause at least one of the at least one processor to add the content data to the content-oriented data management system at a later time using the content identifier, wherein the content identifier is generated using a hash value obtained using the content data as a key according to an InterPlanetary File System protocol while the content data is initially stored in a location-oriented data management system that references data by specifying information indicating a location where data is stored, and wherein when content data that had not been added to the content-oriented data management system when the non-fungible token was issued is added to the content-oriented data management system at the later time, the content identifier issued by the content-oriented data management system will be the same as the content identifier generated in accordance with the InterPlanetary File System protocol, enabling verification of identity of the content data without influencing the generated non-fungible token and enabling the content data to be obtained from the content-oriented data management system by specifying a uniform resource identifier that includes the content identifier even though the content data was not initially added to the content-oriented data management system.

2. The information processing system according to claim 1, wherein the program code further includes:
managing code configured to cause at least one of the at least one processor to manage location-oriented data including managing the content data related to the content identifier generated by the processor; and
adding code configured to cause at least one of the at least one processor to add the content data managed by the location-oriented data managing to the content-oriented data management system with use of the content identifier generated by the processor.

3. The information processing system according to claim 1, wherein the program code further includes:
adding code configured to cause at least one of the at least one processor to add the metadata to the content-oriented data management system, wherein the acquisition code is further configured to cause at least one of the at least one processor to acquire, as the metadata identifier, an identifier issued by the content-oriented data management system when the metadata is added to the content-oriented data management system.

4. The information processing system according to claim 1, wherein the program code further includes:

issuing code configured to cause at least one of the at least one processor to issue a plurality of non-fungible token linked to one combination of the metadata and the content by recording, in the blockchain, a plurality of pieces of token data including combinations of common metadata identifier and additional data which is differ from each other.

5. The information processing system according to claim 1, wherein the predetermined secret key is a secret key of a provider of the content.

6. The information processing system according to claim 1, wherein the generation code is further configured to cause at least one of the at least one processor to generate the metadata so as to further include the hash value.

7. The information processing system according to claim 1, wherein the generation code is further configured to cause at least one of the at least one processor to generate the metadata so as to further include information regarding a distribution of value performed in a transaction of the non-fungible token.

8. The information processing system according to claim 7, wherein the generation code is further configured to cause at least one of the at least one processor to generate the metadata so as to include, as the information regarding the distribution of value, at least one of information indicating a distribution destination of the value, information indicating an attribute of the distribution destination, and information for calculating an amount to be distributed to the distribution destination.

9. The information processing system according to claim 7, wherein the program code further includes:

execution code configured to cause at least one of the at least one processor to execute value distribution processing that accompanies a transaction of the non-fungible token, based on the information regarding the distribution of value.

10. The information processing system according to claim 1, wherein the generation code is further configured to cause at least one of the at least one processor to generate the metadata so as to further include at least one of information on a provider of the content, information on a performer related to the content, credit information related to an intellectual property right related to the content, information on a group related to the content, date/time information related to the content, location information related to the content, and event information related to the content.

11. The information processing system according to claim 1, wherein the generation code is further configured to cause at least one of the at least one processor to generate the metadata so as to further include group information on the group related to the content and member information on a member belonging to the group.

12. The information processing system according to claim 1, wherein the generation code is further configured to cause at least one of the at least one processor to generate the metadata so as to further include position information related to the member.

13. The information processing system according to claim 1, wherein the generation code is further configured to cause at least one of the at least one processor to generate the metadata so as to further include information indicating how the content data is to be processed by a terminal of a user in order for the content to be received by the user.

14. The information processing system according to claim 1, wherein the generation code is further configured to cause at least one of the at least one processor to generate the metadata so as to further include information indicating a maximum number of non-fungible tokens issuable for the content.

15. A method performed by a computer, the method comprising;

generating a content identifier for content data in accordance with a content identifier generation procedure for a content-oriented data management system regardless of whether the content data is to be added to the content-oriented data management system;

acquiring a hash value generated based on a key containing content data linked to a non-fungible token;

generating metadata for a content, the metadata including an electronic signature generated using the hash value and a predetermined secret key and a resource identifier referenced when acquiring the content data;

acquiring a metadata identifier uniquely indicating the metadata;

issuing the non-fungible token linked to the metadata and the content, by recording token data including the metadata identifier in a blockchain; and adding the content data to the content-oriented data management system at a later time using the content identifier, wherein the content identifier is generated using a hash value obtained using the content data as a key according to an InterPlanetary File System protocol even though the content data is initially stored in a location-oriented data management system that references data by specifying information indicating a location where data is stored, and wherein when content data that had not been added to the content-oriented data management system when the non-fungible token was issued is added to the content-oriented data management system at the later time, the content identifier issued by the content-oriented data management system will be the same as the content identifier generated in accordance with the InterPlanetary File System protocol, enabling verification of identity of the content data without influencing the generated non-fungible token and enabling the content data to be obtained from the content-oriented data management system by specifying a uniform resource identifier that includes the content identifier even though the content data was not initially added to the content-oriented data management system.

16. A non-transitory computer-readable recording medium storing a computer program that when executed by at least one processor, causes the at least one processor to:

generate a content identifier for content data in accordance with a content identifier generation procedure for a content-oriented data management system regardless of whether the content data is to be added to the content-oriented data management system;

acquire a hash value generated based on a key containing content data linked to a non-fungible token;

generate metadata for a content, the metadata including an electronic signature generated using the hash value and a predetermined secret key and a resource identifier referenced when acquiring the content data;

acquire a metadata identifier uniquely indicating the metadata;

issue the non-fungible token linked to the metadata and the content, by recording token data including the metadata identifier in a blockchain; and add the content data to the content-oriented data management system at a later time using the content identifier, wherein the content identifier is generated using a hash value obtained using the content data as a key according to an InterPlanetary File System protocol even though the content data is initially stored in a location-oriented data management system that references data by specifying information indicating a location where data is stored, and wherein when content data that had not been added to the content-oriented data management system when the non-fungible token was issued is added to the content-oriented data management system at the later time, the content identifier issued by the content-oriented data management system will be the same as the content identifier generated in accordance with the InterPlanetary File System protocol, enabling verification of identity of the content data without influencing the generated non-fungible token and enabling the content data to be obtained from the content-oriented data management system by specifying a uniform resource identifier that includes the content identifier even though the content data was not initially added to the content-oriented data management system.

* * * * *